US009047070B2

(12) United States Patent
Roy-Faderman

(10) Patent No.: US 9,047,070 B2
(45) Date of Patent: Jun. 2, 2015

(54) SYSTEM, METHOD AND COMPUTER PROGRAM PRODUCT FOR DEFINING APPLICATIONS USING METADATA RECORDS CREATED FROM AN OBJECT SPECIFYING A PREDEFINED METADATA FORMAT

(75) Inventor: Avrom Roy-Faderman, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 281 days.

(21) Appl. No.: 13/569,113

(22) Filed: Aug. 7, 2012

(65) Prior Publication Data
US 2013/0117291 A1 May 9, 2013

Related U.S. Application Data

(60) Provisional application No. 61/555,119, filed on Nov. 3, 2011.

(51) Int. Cl.
*G06F 17/30* (2006.01)
*G06F 9/44* (2006.01)

(52) U.S. Cl.
CPC ..................................... *G06F 8/24* (2013.01)

(58) Field of Classification Search
CPC ................................................ G06F 17/30448
USPC .......................... 707/714, 756, 766, 775, 793
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Rahm et al., A survey of approaches to automatic schema matching, Nov. 2001, 1-17.*

*Primary Examiner* — Noosha Arjomandi
(74) *Attorney, Agent, or Firm* — Zilka-Kotab, PC

(57) ABSTRACT

In accordance with embodiments, there are provided mechanisms and methods for defining applications using metadata records created from an object specifying a predefined metadata format. These mechanisms and methods for defining applications using metadata records created from an object specifying a predefined metadata format can enable embodiments to provide third party developers a manner of defining a custom format for metadata that is separate from any existing standard metadata formats that are part of a platform maintaining the metadata.

18 Claims, 7 Drawing Sheets

(56) References Cited

U.S. PATENT DOCUMENTS

| | | | |
|---|---|---|---|
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,730,478 B2 * | 6/2010 | Weissman | 717/171 |
| 7,779,039 B2 * | 8/2010 | Weissman et al. | 707/793 |
| 7,802,230 B1 * | 9/2010 | Mendicino et al. | 717/113 |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 8,375,046 B2 * | 2/2013 | Dettinger et al. | 707/763 |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2002/0169788 A1 * | 11/2002 | Lee et al. | 707/104.1 |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0208493 A1 * | 11/2003 | Hall et al. | 707/100 |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0133605 A1 * | 7/2004 | Chang et al. | 707/104.1 |
| 2004/0186860 A1 | 9/2004 | Lee et al. | |
| 2004/0193510 A1 | 9/2004 | Catahan, Jr. et al. | |
| 2004/0194015 A1 * | 9/2004 | Hays et al. | 715/501.1 |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2007/0067373 A1 * | 3/2007 | Higgins et al. | 707/206 |
| 2008/0249972 A1 | 10/2008 | Dillon | |
| 2009/0063415 A1 | 3/2009 | Chatfield et al. | |
| 2009/0063555 A1 * | 3/2009 | Fisher et al. | 707/103 R |
| 2009/0077091 A1 * | 3/2009 | Khen et al. | 707/10 |
| 2009/0083738 A1 * | 3/2009 | Kruglick et al. | 718/100 |
| 2009/0100342 A1 | 4/2009 | Jakobson | |
| 2009/0177744 A1 | 7/2009 | Marlow et al. | |
| 2009/0222859 A1 * | 9/2009 | Barsness et al. | 725/50 |
| 2011/0258225 A1 * | 10/2011 | Taylor et al. | 707/769 |
| 2012/0331016 A1 * | 12/2012 | Janson et al. | 707/809 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0304713 A1 * | 11/2013 | Roy-Faderman | 707/702 |

\* cited by examiner

SYSTEM, METHOD AND COMPUTER PROGRAM PRODUCT FOR DEFINING APPLICATIONS USING METADATA RECORDS CREATED FROM AN OBJECT SPECIFYING A PREDEFINED METADATA FORMAT

CLAIM OF PRIORITY

This application claims the benefit of U.S. Provisional Patent Application 61/555,119 entitled "Packageable Structured Metadata for Database Objects and Fields," by Roy-Faderman et al., filed Nov. 3, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to metadata in a computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, metadata has been used to describe data. The metadata, in some circumstances, can describe a format of the data, a type of the data, etc. However, techniques for defining metadata have generally exhibited various limitations. For example, the metadata itself has typically been incapable of being described by other metadata in a standard manner made available to third party developers of a platform maintaining the metadata. Accordingly, it is desirable to provide techniques to the third party developers enabling a metadata format to be predefined for creating metadata for data in accordance with the predefined format.

BRIEF SUMMARY

In accordance with embodiments, there are provided mechanisms and methods for defining applications using metadata records created from an object specifying a predefined metadata format. These mechanisms and methods for defining applications using metadata records created from an object specifying a predefined metadata format can enable embodiments to provide third party developers a manner of defining a custom format for metadata that is separate from any existing standard metadata formats that are part of a platform maintaining the metadata.

In an embodiment and by way of example, a method for defining applications using metadata records created from an object specifying a predefined metadata format is provided. In use, a definition of a custom object specifying a custom format for metadata is received from a first party at a database system, wherein the definition of the custom object includes a relationship with at least one of a standard object defined by a platform provider of the database system that specifies a standard format for metadata and another custom object specifying another custom format for metadata. Additionally, the custom object having the definition is stored. Further, a first record is created by the first party or a second party according to the stored custom object which defines metadata according to the custom format. Further, the first record is related to a second record created according to the at least one of the standard object and the other custom object. Moreover, at least one aspect of an application is defined, using the metadata of the first record and the relationship of the first record to the second record.

While one or more implementations and techniques are described with reference to an embodiment in which defining applications using metadata records created from an object specifying a predefined metadata format is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for defining applications using metadata records created from an object specifying a predefined metadata format.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing defining applications using metadata records created from an object specifying a predefined metadata format will be described with reference to example embodiments.

Figure 1:
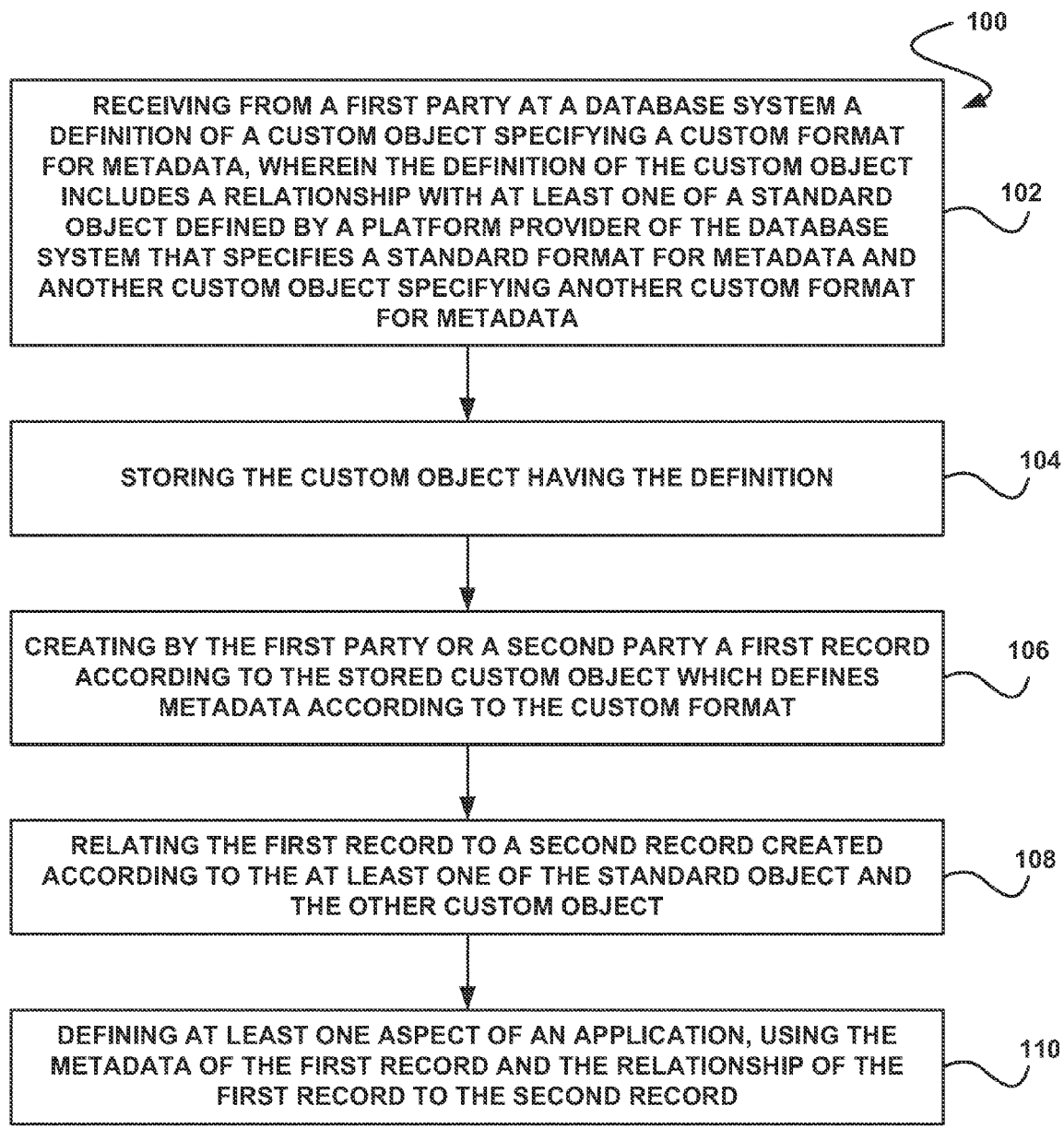
FIG. 1 illustrates a method for defining applications using metadata records created from an object specifying a predefined metadata format, in accordance with an embodiment.

FIG. 1 illustrates a method 100 for defining applications using metadata records created from an object specifying a predefined metadata format, in accordance with an embodiment. As shown in operation 102, a definition of a custom object specifying a custom format for metadata is received from a first party at a database system, where the definition of the custom object includes a relationship with at least one of a standard object defined by a platform provider of the database system that specifies a standard format for metadata and another custom object specifying another custom format for metadata. In the context of the present description, the custom object may be any container capable of being defined for specifying the custom format for metadata and capable of being defined to include a relationship to the standard object and/or other custom object. For example, the custom object may be a record where the definition of the record includes data specifying the custom format of the metadata and further includes a reference to the standard object and/or other custom object.

Moreover, the metadata for which the custom format is specified by the custom object may be any descriptive data capable of being used to define at least one aspect of an application, as described in more detail below. It should be noted that the custom object may be defined in any manner that specifies the custom format for the metadata. In this way, the custom object may optionally specify the custom format that metadata is required to take. As a further option, only metadata created with reference to the custom object may be required to comply with the custom format specified by the custom object. Thus, different custom objects may be defined to specify different custom metadata formats, such that metadata referencing one of the custom objects is created in a custom format specified by that custom object.

In one exemplary embodiment, the definition of the custom object may specify the custom format by specifying fields of the metadata. Further, with respect to such embodiment, the definition of the custom object may specify the fields to be included in the metadata. Accordingly, where the metadata is formed using a record, the record may reference the custom object, and may further include the fields specified by the custom object along with customized values for those fields.

In another embodiment, the definition of the custom object may include the relationship with the standard object defined by the platform provider of the database system that specifies the standard format for metadata. For example, the standard object may specify the standard format for fields, tables, columns, pages, etc. In this way, metadata defined according to the standard format may be standard metadata such as table definitions, column definitions, page definitions, etc. In yet another embodiment, the definition of the custom object may include the relationship with the other custom object specifying the other custom format for metadata.

As an option, the definition of the custom object may include the aforementioned relationship(s) with the standard object/other custom object by including in the custom object a foreign key to the standard object/other custom object. As another option, the definition of the custom object may include the aforementioned relationship(s) with the standard object/other custom object by using a junction object having a reference to both the custom object and the standard object/other custom object. In this way, the relationship may be a one-to-many relationship.

As noted above, the definition is received at the database system from the first party. Such first party may be any party that is separate from the platform provider of the database system. In one embodiment, the first party may be a third-party developer using the database system (e.g. to develop applications). In another embodiment, where the database system is a multi-tenant on-demand database system, the first party may be a first tenant of the multi-tenant on-demand database system. For example, the first party may be a platform developer that is a first user of the database system. The platform developer may use a platform of the database system to define the custom object, in one embodiment. Such platform developer may therefore customize the metadata format specified by a particular custom object to be used in creating metadata.

As an option, in response to receipt of the definition of the custom object from the first party, additional information may be automatically included in the definition of the custom object (e.g. in accordance with predefined rules, etc.). Such additional information may be automatically included in the definition by the database system, in one embodiment. In another embodiment, the automatically included additional information may specify predetermined fields, such as a name field and a developer identifier field, as described in more detail below.

Additionally, as shown in operation 104, the custom object having the definition is stored. In one embodiment, the custom object may be stored in the database system. In another embodiment, the custom object may be stored in a manner that allows other users of the database system to access the custom object (e.g. to create metadata having reference to the custom object).

Further, as shown in operation 106, a first record is created by the first party or a second party according to the stored custom object which defines metadata according to the custom format. The first record may be a row in a table of a database, for example. Of course, however, the first record may be any structure created according to the stored custom object that defines metadata according to the custom format specified by the custom object.

In the exemplary embodiment described above where the custom object specifies the custom format of the metadata by specifying fields of the metadata, the first record may be created according to the custom format of the stored custom object by storing metadata (e.g. including values) for each of the fields specified by the custom object. In this way, the first record may be created to define metadata required by the custom object. As noted above, the first record may optionally be created according to the stored custom object by including in the record a reference to the stored custom object. As another option, the first record may be created according to the stored custom object using a user interface (e.g. of the database system) associated with the stored custom object.

As noted above, the first record is created by the first party or a second party. In the present description, the second party may be any party that is separate from the first party and the platform provider of the database system. In one embodiment where the first party is the third-party developer, the second party may be a user of code developed by the third-party developer. In another embodiment, where the database system is a multi-tenant on-demand database system, the second party may be a second tenant of the multi-tenant on-demand database system. In yet another embodiment, the second party may be an application developer that is a second user of the database system. The first party may use the custom object defined by the first party to develop an application, as described in more detail below.

In one embodiment, the first record may be created in response to a request to create the first record received from the first party or the second party. Such request may specify the metadata. In other embodiments, the request from the first party/second party may specify a first portion of the metadata, and a second portion of the metadata may be automatically specified for the first record (e.g. in accordance with the aforementioned predefined rules, for the predetermined fields, etc.).

Moreover, as shown in operation 108, the first record is related to a second record created according to the at least one of the standard object and the other custom object. The second record may therefore be metadata created according to the standard object and/or the other custom object. As an option, the first record may be related to the second record by the first party/second party by which the first record was created.

The first record may be related to the standard object and/or the other custom object based on the relationship included in the definition of the custom object. For example, the first record may be created to include the relationship as defined by the custom object. In one embodiment, a foreign key to the second record may be included in the first record. In another embodiment, the a junction record created according to the aforementioned junction object may be created having a reference to both the first record and the second record.

Furthermore, in operation 110, at least one aspect of an application is defined, using the metadata of the first record and the relationship of the first record and the second record. In the present embodiment, the application may be any code (e.g. procedural code, declarative expressions, declarative validations, etc.) having one or more aspects that are capable of being defined using the metadata of the first record and the related second record. Thus, the metadata of the first record and the related second record may be used to customize, create, etc. the application. Thus, the application may not necessarily be a standalone business application, but may include procedural code with behaviors that are configurable using the metadata. For example, the application may be a toolkit of configurable behaviors.

In one embodiment, the application may be a graphical user interface, such as a form with fields for receiving input by a user. With respect to such embodiment, a component of the graphical user interface (e.g. entry field, button, etc.) may be defined using the metadata by including for such component a reference to the first record having the metadata. Such metadata may describe the content to be included in the component of the graphical user interface, for example.

To this end, the custom object defined in operation 102 may optionally relate to a component of a user interface, such as a visual component of the user interface. Such custom object may specify the custom format for the metadata to be defined for an instance of the component to be included in the application. The aspect of the application may accordingly implement the component of the user interface, for example, in accordance with the metadata of the first record formatted as specified by the custom object.

In another embodiment, the application may be a backend application without an interface for a user, such as an application executed by another application which may or may not be a graphical user interface. With respect to such other embodiment, a component of the backend application (e.g. algorithm, etc.) may be defined using the metadata by including for such component a reference to the first record having the metadata. Such metadata may describe the input to the component of the backend application, for example.

Further, the aspect of the application may be defined by the application developer, such as by referencing the first record. For example, the application developer, by providing the first record having the metadata which is related to standard metadata (e.g. also provided by the application developer), can create a functioning business application using the application (e.g. toolkit).

It should be noted that the aspect of the application that is defined using the metadata may be any portion of the application that is developed (e.g. coded, etc.) by the first party that defined the custom object. The second party may then specify the manner in which the aspect of the application executes by having the aspect of the application reference the first record, such that the metadata included therein can be used to control the manner in which the aspect of the application executes. Accordingly, the aspect of the application may be developed in a manner that defers some decisions to the metadata that the second party specifies. In particular, the custom object may allow the first party to write procedural code of the aspect of the application without necessarily knowing the specifics of the metadata it will use. Similarly, the custom object may allow the second party to customize the functionality of the aspect of the application by providing the first (i.e. metadata) record, without necessarily knowing, writing, etc. the procedural code.

In another embodiment, the aspect of the application may be developed by the first party and further defined (i.e. customized) by the first party using the metadata record. For example, the first party may use its own defined custom object to define the functionality of its own application. This may be the case, where for example a developer of an entity (e.g. tenant of multi-tenant on-demand database system) defines the custom object, and an administrator of that same entity creates the metadata according to the custom object.

Once the application is defined, including defining the aspect of the application using the metadata of the first record, the application may be published for execution thereof (e.g. by end users of the database system having access to the application, etc.). For example, in response to execution of the application by an end user of the database system, the first record may be retrieved (e.g. via the reference thereto) to provide the aspect of the application in accordance with the metadata of the first record.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
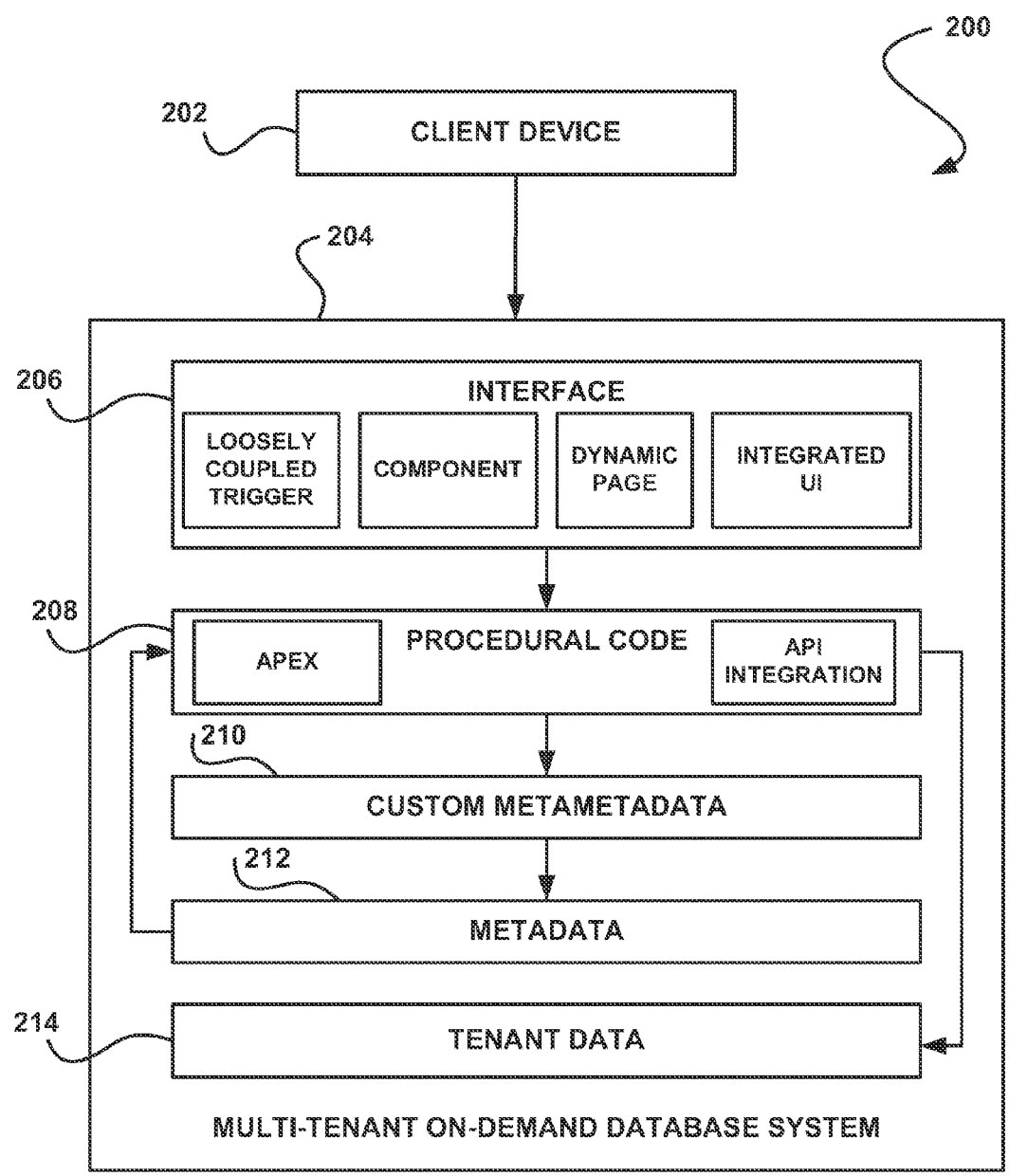
FIG. 2 illustrates a system implementing metametadata objects, in accordance with an embodiment.

FIG. 2 illustrates a system 200 implementing metametadata objects, in accordance with an embodiment. As an option, the present system 200 may be implemented in the context of the method 100 of FIG. 1. Of course, however, the system 200 may be implemented in any desired environment. It should also be noted that the aforementioned definitions may apply during the present description.

As shown, a client device 202 is in communication with a multi-tenant on-demand database system 204. The client device 202 may be any user computer capable of being used by a user to access the multi-tenant on-demand database system 204. Such multi-tenant on-demand database system 204 may be located on one or more servers accessible to the client device 202 via a network. It should be noted that while a multi-tenant on-demand database system 204 is described with reference to the present embodiment, the client device 202 may similarly be in communication with any database system.

The multi-tenant on-demand database system 204 includes an interface 206 for interfacing the client device 202 to various components of the multi-tenant on-demand database system 204. In one embodiment, the client device 202 may be used by a user to access the multi-tenant on-demand database system 204 for defining metametadata objects. In the context of the present embodiment, a metametadata object is an object specifying a custom format for metadata according to which a record having metadata is to be created (e.g. such as the object described above with respect to operation 102 of FIG. 1). The client device 202 may interact with a metametadata object creating application of the multi-tenant on-demand database system 204 for allowing the user thereof to define the metametadata object. Once defined, the metametadata object may be stored by the multi-tenant on-demand database system 204 as custom metametadata 210. In one embodiment, the user of the client device 202 may be a platform developer (or associated therewith) that is independent of a provider (e.g. creator) of the multi-tenant on-demand database system 204, who creates the metametadata object for extending the base platform provided by the provider of the multi-tenant on-demand database system 204.

The multi-tenant on-demand database system 204 also includes procedural code 208 for use in accessing tenant data 214 of the multi-tenant on-demand database system 204. The tenant data 214 may be any data that is specific to a tenant of the multi-tenant on-demand database system 204. Such tenant data 214 may optionally not be shared among other tenants of the multi-tenant on-demand database system 204, for example.

The procedural code 208 may be an application having at least one aspect that is capable of being defined by metadata 212 created in accordance with a metametadata object stored in the custom metametadata 210. Such metadata 212 may be created by an application developer of the multi-tenant on-demand database system 204, and used to configure an aspect of the application, whereas the metametadata object stored in the custom metametadata 210 may be created by the platform developer of the multi-tenant on-demand database system 204.

In one embodiment, the client device 202 may be used by a user to access the multi-tenant on-demand database system 204 for executing the application stored by the multi-tenant on-demand database system 204 in accordance with the metadata 212. Such application may be accessible to the client device 202 via the interface 206, for example. Upon execution of the application, a reference to the metadata 212 may be identified along with a dependency of the metadata 212 on the metametadata object stored in the custom metametadata 210. The procedural code 208 may execute, for the user of the client device 202, the application defined according to the metadata 212. Thus, the metametadata object may be used at runtime of the application such that the application is defined according to the metadata 212.

In one exemplary embodiment, a user performs an action or inserts data, and a hook activates the procedural code 208. The platform provider may provide both the hook and the procedural code 208. The procedural code 208 queries metadata 212 provided by an application developer to determine behavior appropriate to this case (e.g. namely which table the user is attempting to perform an operation on, or which page the user is currently viewing), such that the procedural code 208 uses the queried metadata 212, in addition to the relationship held by the metadata 212, to look up one or more specific metadata records which specify behavior for the application. In accordance with the determined behavior, the procedural code 208 writes results to the tenant data 214, and/or displays further user interface, fires an event such as an email, or sends a message via an integration, etc.

Figure 3:
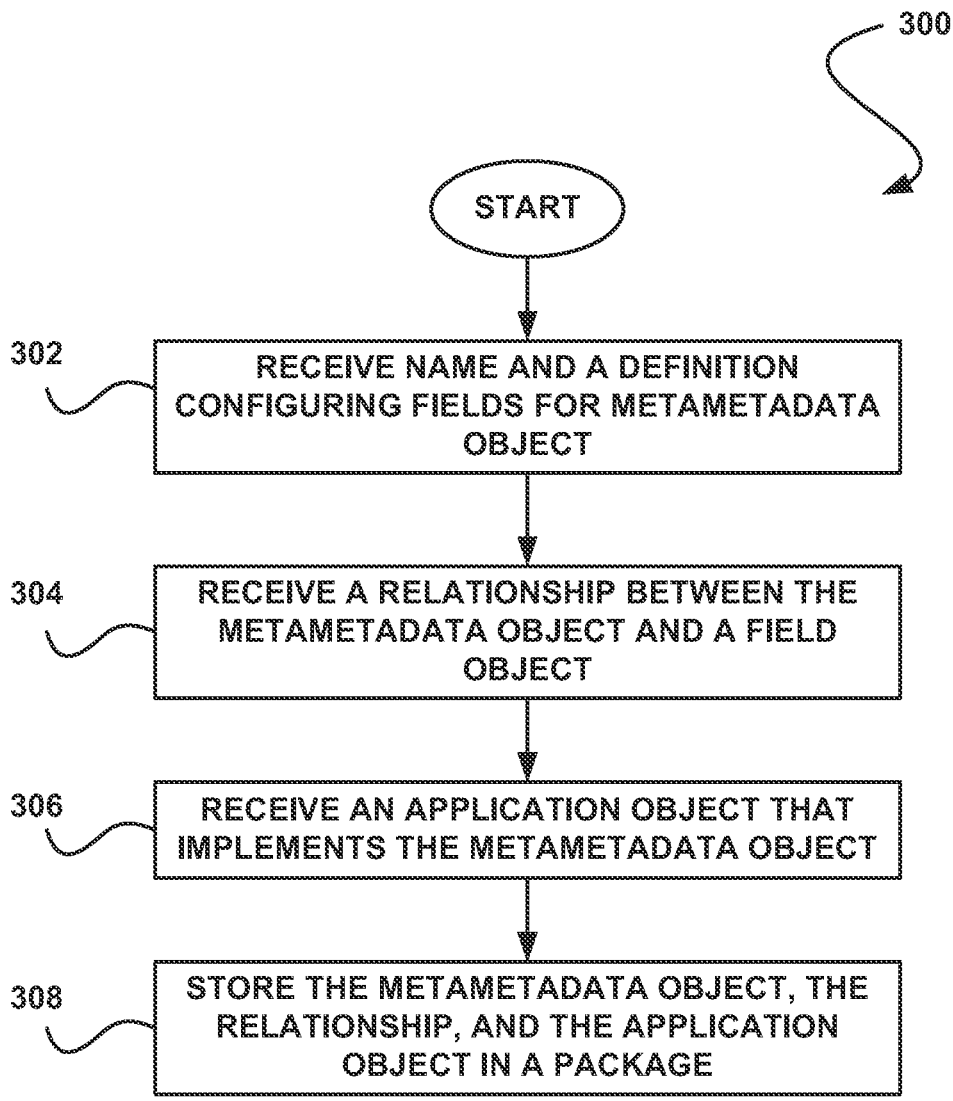
FIG. 3 illustrates a method for defining a package having a metametadata object, in accordance with an embodiment.

FIG. 3 illustrates a method 300 for defining a package having a metametadata object, in accordance with an embodiment. As an option, the present method 300 may be carried out in the context of the environments of FIGS. 1 and/or 2. For example, the method 300 may be performed by the multi-tenant on-demand database system with reference to input received from a platform developer. Of course, however, the method 300 may be carried out in any desired environment. Again, it should be noted that the aforementioned definitions may apply during the present description.

As shown in operation 302, a name and a definition configuring fields for a metametadata object are received. The name may be a name of the metametadata object, such as a unique name to be used for referencing the metametadata object. The definition may be any configuration of fields to be specified by the metametadata object, for use in creating metadata in accordance with the specification of the metametadata object.

Additionally, as shown in operation 304, a relationship between the metametadata object and a field object is received. The field object may represent a format for a field, in one embodiment. Thus, the relationship may enable the metametadata object to specify particular fields of the field object type (e.g. having the format specified by the field object).

In one embodiment, the metametadata object may have a one-to-many relationship with the field object representing the format for the field. For example, the metametadata object may specify multiple different fields of the field object type. Thus, each of the fields specified by the metametadata object may optionally reference the field object.

As an option, the one-to-many relationship may be defined by storing a foreign key to the field object in the metametadata object. As another option, the one-to-many relationship may be defined by creating a junction object having a reference to both the metametadata object and the field object. Such junction object may be another metametadata object, for example, having a first metadata relationship field pointing to the metametadata object and having a second metadata relationship field pointing to the field object.

Further, an application object that implements the metametadata object is received, as shown in operation 306.

The application object may be a user interface component that is configured in accordance with metadata created from the metametadata object and then displayed on a user interface. As another example, the application object may be a backend component that is configured in accordance with metadata created from the metametadata object and then provided as input to other operations of a backend application. Thus, the application object may implement the metametadata object in one or more aspects of the application.

The metametadata object, the relationship, and the application object are then stored in a package, as shown in operation 308. The package may be any container having the metadata object, the relationship, and the application object. Such package may also include instructions for using the metametadata object, such as instructions for defining one or more aspects of an application using the metametadata object. Further, the package may be stored by a multi-tenant on-demand database service, for use by application developers in defining at least one aspect of an application using metadata defined in accordance with the package.

To this end, platform features may be provided that allow users of a platform (e.g. multi-tenant on-demand database system) to relate their own metadata types (i.e. metametadata object) to standard metadata types (e.g. database objects, columns of database objects, user interface pages, packages, etc.) or to other custom metadata types.

Figure 4:
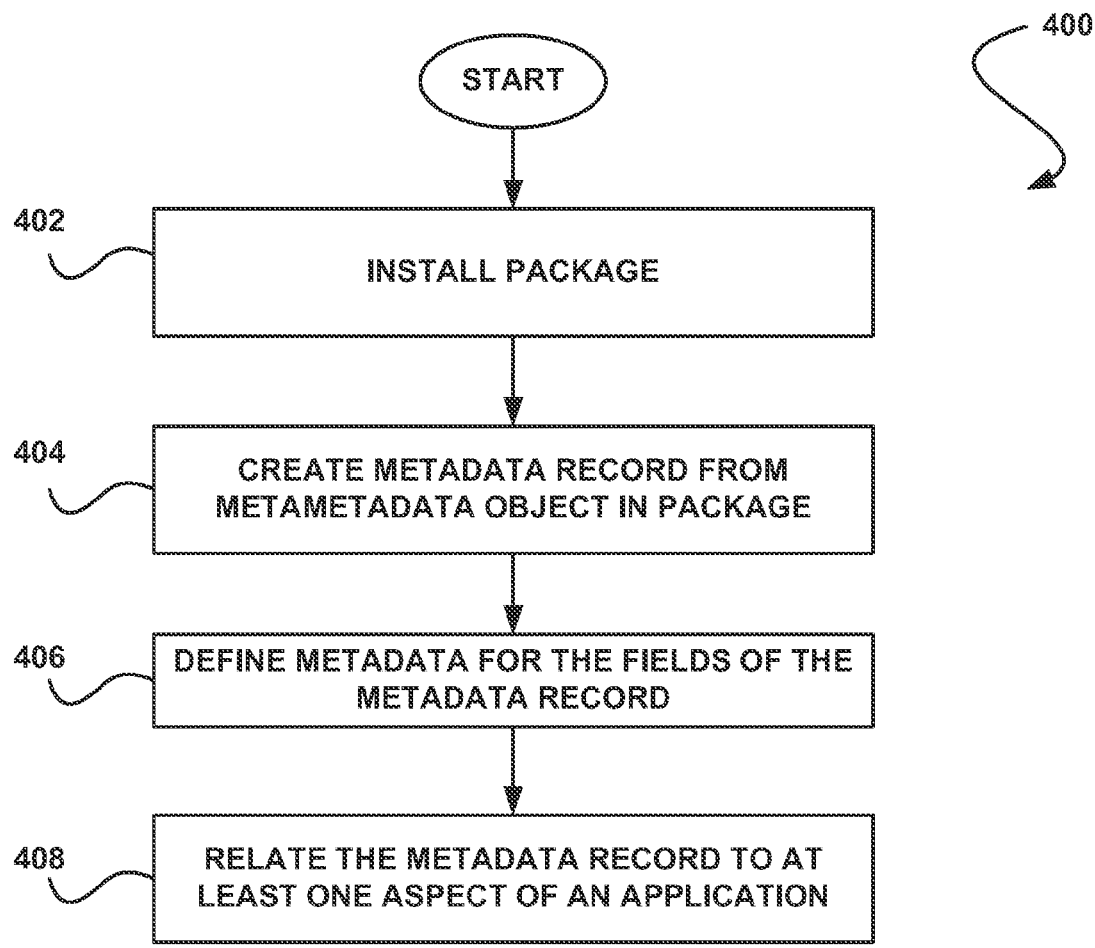
FIG. 4 illustrates a method for defining an aspect of an application using a metametadata object, in accordance with an embodiment.

FIG. 4 illustrates a method 400 for defining an aspect of an application using a metametadata object, in accordance with an embodiment. As an option, the present method 400 may be carried out in the context of the environment of FIGS. 1-3. For example, the method 400 may be performed by the multi-tenant on-demand database system in accordance with input received from an application developer. Of course, however, the method 400 may be carried out in any desired environment. Yet again, it should be noted that the aforementioned definitions may apply during the present description.

As shown in operation 402, a package is installed. In the present embodiment, the package includes a metametadata object, a relationship between the metametadata object and a field object, and an application object used for implementing the metametadata object. The package may be installed for use thereof in defining at least one aspect of an application using metadata defined in accordance with the package.

In addition, as shown in operation 404, a metadata record is created from the metametadata object in the package. The metadata record may be created to have the metadata fields specified by the metametadata object in addition to a relationship specified by the metametadata object. Further, metadata for the fields of the metadata record are defined, as shown in operation 406. The metadata may describe an aspect of an application, as described in more detail below.

Still yet, the metadata record is related to at least one aspect of an application. Note operation 408. Optionally, the metadata record may be referenced with respect to the aspect of the application to customize the aspect of the application. In one example, the aspect of the application may be a field (e.g. table column) of a user-defined table, such that the metadata record may be related to the field of the user-defined table for indicating the manner in which the field is to be handled (e.g. displayed, processed, etc.) by the application.

Figure 5:
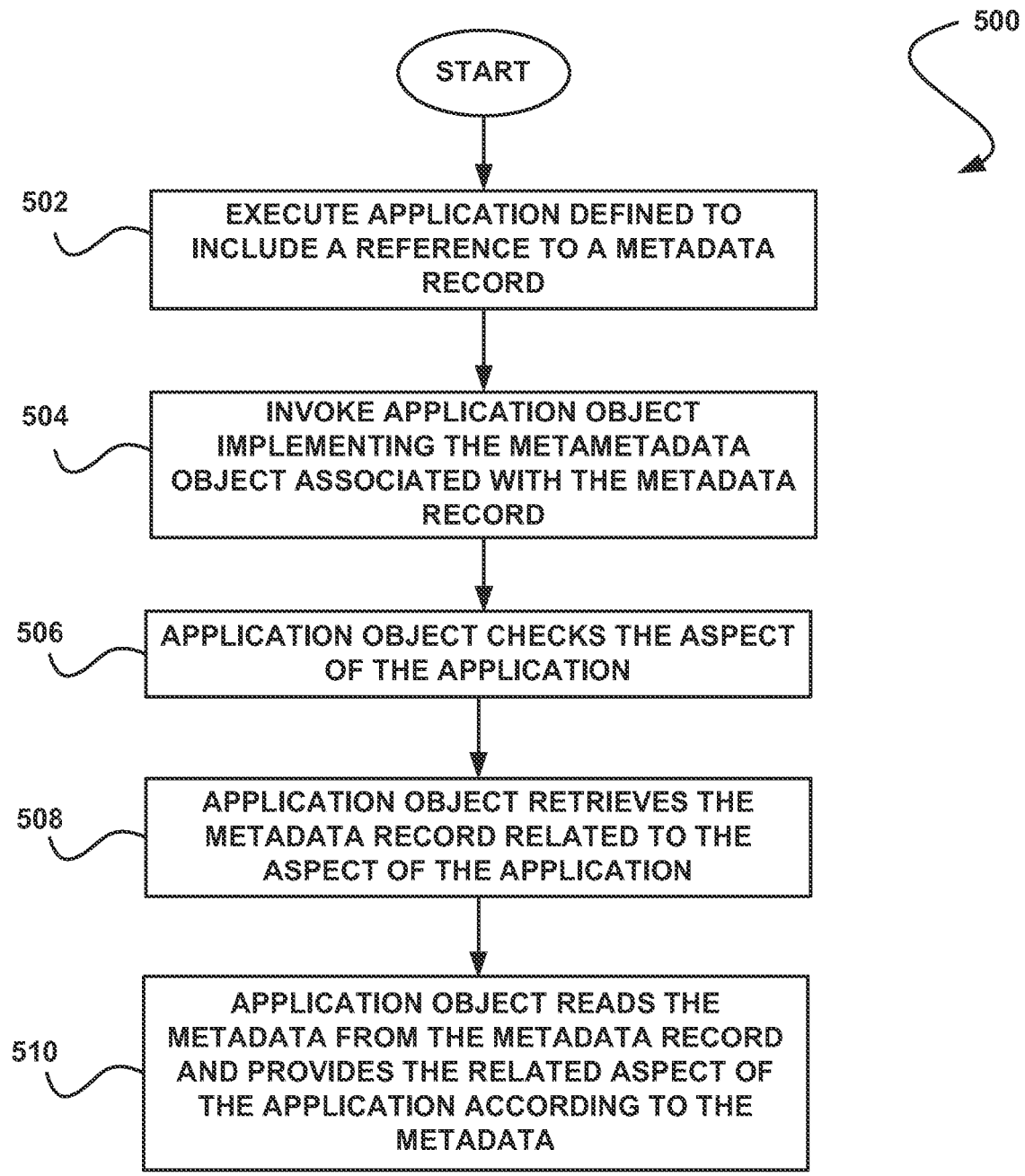
FIG. 5 illustrates a method for executing an application having an aspect defined using a metametadata object, in accordance with an embodiment.

FIG. 5 illustrates a method 500 for executing an application having an aspect defined using a metametadata object, in accordance with an embodiment. As an option, the present method 500 may be carried out in the context of the environment of FIGS. 1-4. For example, the method 500 may be performed by the multi-tenant on-demand database system in accordance with input received from a user associated with a tenancy of the application developer with the multi-tenant on-demand database system. Of course, however, the method 500 may be carried out in any desired environment. Yet again, it should be noted that the aforementioned definitions may apply during the present description.

As shown in operation 502, an application defined to include a reference to a metadata record is executed. Where the application is a user interface including a form, the application may be executed for displaying the form to a user. Where the application is a backend application, the application may be executed for obtaining a result of the execution to be used as input to another application.

Additionally, as shown in operation 504, an application object implementing the metametadata object associated with the metadata record is invoked. The application object may be invoked to execute the aspect of the application defined by the metadata record. In particular, as shown in operation 506, the application object checks the aspect of the application.

The application object then retrieves the metadata record related to the aspect of the application, as shown in operation 508. For example, the application object may use a reference to the metadata record stored with respect to the aspect of the application for retrieving the metadata record. The application object then reads the metadata from the metadata record and provides (e.g. executes, etc.) the related aspect of the application according to the metadata. Note operation 510.

Exemplary Use Case

In one exemplary use case, a platform developer, PD, wants to provide a "universal picklist" feature, which lets application developers create a single set of picklist options that can then act as options for multiple fields.

To start with, PD creates a custom metametadata object called "UniversalPicklist". PD defines UniversalPicklist to have the following fields (in addition to developer name and ID fields, which are defined by the multi-tenant on-demand database system for all custom metametadata (MMD) objects): (1) Options: This is along text area field containing a list of the options the picklist should display, one on each line; and (2) SortAlpha: This is a checkbox value determining whether the picklist should display the options in the order in which they are entered, or alphabetically.

PD might want to create a one-to-many relationship between UniversalPicklist and the standard "Field" object (provided by the multi-tenant on-demand database system and used to represent fields of ordinary objects). In one embodiment, this relationship may be created by adding a foreign key (relationship) field to the field object. In another embodiment, a one-to-one cardinality type for metadata relationships may be created, where PD can get this functionality by creating another custom metametadata object, "UniversalPicklistUsage". This object acts as a junction object because PD gives it the following two fields: (1) Picklist, a metadata relationship field pointing to UniversalPicklist, with a cardinality of 1 . . . * (one UniversalPicklist has any number of PicklistUsages, but each PicklistUsage must have exactly one UniversalPicklist); and (2) CustomField, a metadata relationship field pointing to the "Field" object, with cardinality of 0-1 . . . 1 (one Field can have either no PicklistUsages or exactly one, but every PicklistUsage needs a field).

The platform developer also creates a user interface component to actually display the universal picklist. They distribute all of this together, along with instructions for use: "To use a universal picklist on your custom fields: First, define the universal picklist. Then, make your field of type 'TEXT.' Next, create a PicklistUsage that points to both your field and your UniversalPicklist. Finally, use our provided UI component wherever you want to display your field.

Furthermore, an application developer, AD, works for an insurance company in the bay area, and installs PD's package. They want to create a picklist containing bay area counties that can be used for fields in various of their custom objects.

AD creates the following metadata:

One UniversalPicklist record that they name "County". AD sets County's Options field to contain a list of all the counties in their service area (e.g. San Francisco, San Mateo, Santa Clara, Alameda, Contra Costa, Marin), and AD decides to display these counties in the order in which they've entered them, so they leave the SortAlpha checkbox clear.

AD wants to use this UniversalPicklist record in several places in their application. In particular, AD wants their Provider custom object to have a field denoting the provider's primary county of business. But they also want their Service-Delivery object to have the county in which the service was delivered (because some providers might provide in-home care, or have a secondary clinic, or have hospital privileges outside their county). So AD adds TEXT fields to each object; the first called "PrimaryCountyOfBusiness" and the second called "DeliveredInCounty".

To make the fields use their UniversalPicklist record, they create PicklistUsage records. The PicklistUsage records each relate a record of the UniversalPicklist type (e.g. in Table below) with a record of the standard metadata type CustomFieldDefinition (e.g. in Table 2 below) or any other custom metadata type. At this point, they've got metadata in three metametadata tables, shown below:

TABLE 1

| | | UniversalPicklist | |
|---|---|---|---|
| Id | Name | Options | SortAlpha |
| 00x92k34btih2H | County | San Francisco\nSan Mateo\nSantaClara\nAlameda\nContra Costa\nMarin | false |

TABLE 2

| | CustomFieldDefinition | | | |
|---|---|---|---|---|
| Id | Entity | Name | Datatype | (many more attrs) |
| 00N9384hgf9aIj | Provider | PrimaryCountyOfBusiness | TEXT | ... |

TABLE 2-continued

| | CustomFieldDefinition | | | |
|---|---|---|---|---|
| Id | Entity | Name | Datatype | (many more attrs) |
| 00Nfh823q9HI9 | Service-Delivery | DeliveredInCounty | TEXT | ... |
| (AD probably has many more custom fields) | | | ... | ... |

TABLE 3

| | | PicklistUsage | |
|---|---|---|---|
| Id | Name | UniversalPicklist | Field |
| 0axuoHiuheu5 | PCOBUsage | County | Provider.PrimaryCountyOfBusiness |
| 0axuohU8y09h | DICUsage | County | ServiceDelivery.DeliveredInCounty |

AD also uses PD's component in all their user interfaces to display these fields.

An end user, EU, in AD's organization goes to a form designed to let them add a new Provider record. This form includes the PrimaryCountyOfBusiness field.

At runtime, since AD used PD's component in the user interface, that component is invoked. The component checks its field (Provider), and uses a join query between PicklistUsage and UniversalPicklist to retrieve the UniversalPicklist related to the field; that is, the County UniversalPicklist. It reads the Options field from this UniversalPicklist, splits it using the separator character "\n", and renders a picklist containing all the options. EU selects the county they want, and when they save, that county is written into the PrimaryCountyOfBusiness field on the new Provider record.

Exemplary Code Implementation

An application developer may, in one embodiment, use one a predefined application program interface (API) element as an application object. The API element may retrieve its related custom metametadata records, and use a custom metametadata object to retrieve a parent object, as in the following Java example, using a custom metametadata object field_designator_c, with a 0 . . . 1-1 relationship field, s_object_c, SObject types (tables), and another 0 . . . 1-1 relationship field, designated_field_c, to fields (table columns):

TABLE 4

```
1   private Field getDesignatedField(DescribeSObjectResult objectType) {
2       try {
3           QueryResult fieldDesignatorResult = binding.query(
4               "SELECT designated_field_c FROM field_designator_c " +
5               " WHERE s_object_c = " + objectType.getName( ));
6           // cardinality 0..1-1
7           assert fieldDesignatorResult.getSize( ) == 0 ||
8                  fieldDesignatorResult.getSize( ) == 1;
9           if (fieldDesignatorResult.getSize( ) == 0) {
10              //this object doesn't have a field designator
11              return null;
12          }
13          SObject fieldDesignator = fieldDesignatorResult.records[0];
14          String designatedFieldName = fieldDesignator.get_any( )[0];
15          for (Field currField : objectType.getFields( )) {
16              if (designatedFieldName.equals(objectType.getName( ) +
17                     '.' + currField.getName( ))) {
18                  return currField;
19              }
```

TABLE 4-continued

```
20          }
21      } catch (Exception e) {
22          //handle appropriately
23      }
24      //Field not found among object's fields
25      //Throw custom exception
26      throw new DesignatedFieldNotOnSObjectException( );
27  }
```

In the above code example, lines 3-5 call a standard multi-tenant on-demand database system framework to execute a query. This query retrieves the records (if any) of the field_designator_c custom metametadata object where the "s_object_c" field (the foreign key to SObject types) matches the object type passed in to the method.

Lines 7-8 assert that there's at most one of these field_designator_c records matching the SObject. This is checks an assumption that should always be true. Since the cardinality of the relationship is 0 . . . 1-1, there should be at lost one field designator per SObject type.

Lines 9-12 handle the case where no field_designator_c records matched the SObject type. This means that the type has no designated field, so the method returns null immediately.

Line 13 retrieves the (there is exactly one, if the code has reached this line) field_designator_c record.

Line 14 retrieves the value of the "designated_field_c" field (the foreign key to Fields) from that record.

Lines 15-20 loop over all the fields of the SObject type, trying to find one that matches the value of the "designated_field_c" retrieved in Line 14. As soon as it finds a match, the method returns it.

Lines 21-23 handle any exceptions that occurred in the previous lines (such as an inability to connect to the database, or a lack of permission to read the appropriate records). Exactly what is done here is unrelated to this innovation.

Line 26 handles the case where, although a field designator was found for the SObject type, the field it was related to was not among that type's fields (it was presumably a field off an unrelated object). This indicates administrator or developer error—the person who set up the field designator made a mistake—so the code throws an unchecked exception to indicate the error condition.

System Overview

Figure 6:
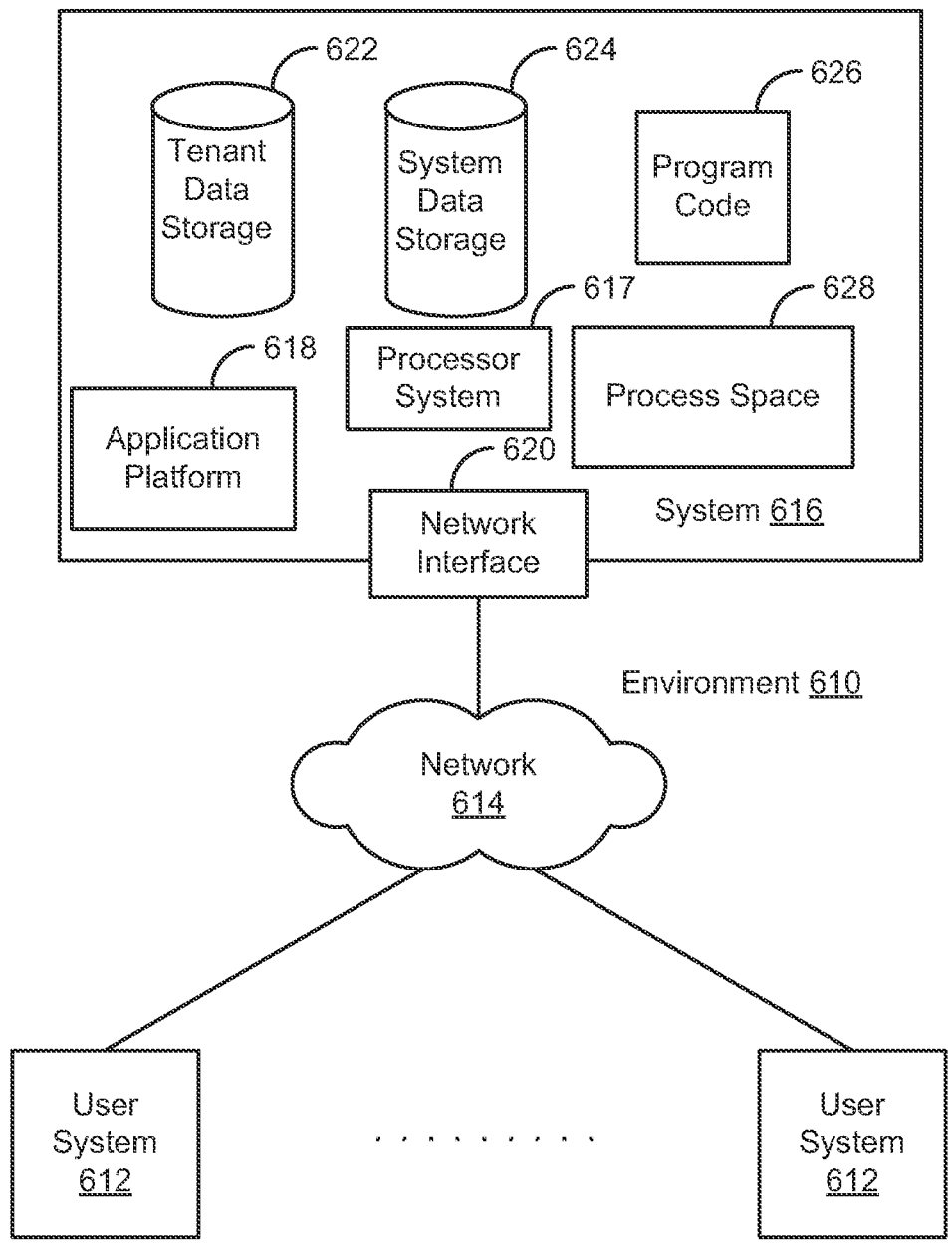
FIG. 6 illustrates a block diagram of an example of an environment wherein an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower, permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used, (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
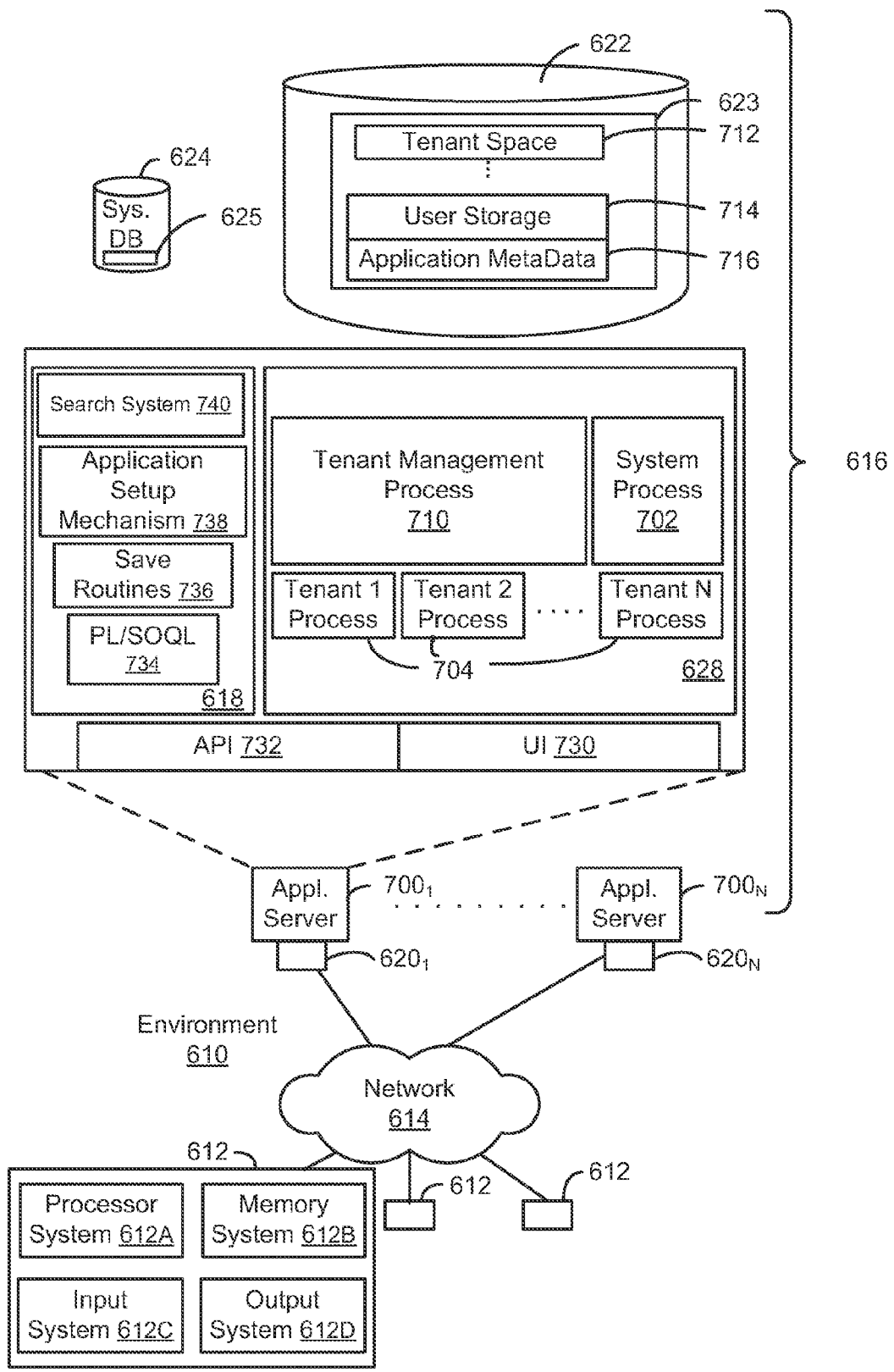
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478, entitled "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, hereby incorporated in its entirety herein for all purposes. Invocations to applications may be detected by one or more system processes, which manages retrieving application metadata 516 for the subscriber making the invocation and executing the metadata us an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code causing a computer to implement a method, the method comprising:
receiving from a first party at a database system a definition of a custom object specifying a custom format for metadata, wherein a creation of the metadata is required to comply with the custom format specified within the custom object when the metadata is associated with the custom object;
storing the custom object having the definition, utilizing the database system;
creating by the first party or a second party utilizing the database system a record according to the stored custom object, where the metadata in the record is defined according to the custom format of the custom object; and
defining at least one aspect of an application utilizing the database system, using the metadata of the record;
wherein the custom object has a one-to-many relationship with a field object representing a format for a field, the one-to-many relationship defined by one of:
storing a foreign key to the field object in the custom object, and
creating a junction object having a reference to both the custom object and the field object.

2. The computer program product of claim 1, wherein the definition of the custom format specifies predetermined fields to be included within the metadata.

3. The computer program product of claim 2, wherein the record stores metadata for each of the fields.

4. The computer program product of claim 1, wherein the first party is a platform developer that is a first user of the database system.

5. The computer program product of claim 1, wherein in response to receipt of the definition of the custom object from the first party, additional information is automatically included in the definition of the custom object.

6. The computer program product of claim 5, wherein the additional information specifies a name field and a developer identifier field.

7. The computer program product of claim 1, wherein the custom object is stored in the database system.

8. The computer program product of claim 1, wherein the record is created in response to a request to create the record received from the second party, and the second party is an application developer that is a second user of the database system.

9. The computer program product of claim 8, wherein the request specifies the metadata.

10. The computer program product of claim 8, wherein the at least one aspect of the application is defined by the application developer.

11. The computer program product of claim 1, wherein the custom object is stored in a package with an application object used for implementing the custom object in the at least one aspect of the application.

12. The computer program product of claim 1, wherein the custom object relates to a component of a user interface.

13. The computer program product of claim 12, wherein the at least one aspect of the application implements the component of the user interface.

14. The computer program product of claim 1, wherein the at least one aspect of the application is defined by referencing the first record.

15. The computer program product of claim 1, wherein in response to execution of the application by an end user of the database system, the record is retrieved to provide the at least one aspect of an application in accordance with the metadata of the record.

16. A method, comprising:
    receiving from a first party at a database system a definition of a custom object specifying a custom format for metadata, wherein a creation of the metadata is required to comply with the custom format specified within the custom object when the metadata is associated with the custom object;
    storing the custom object having the definition, utilizing the database system;
    creating by the first party or a second party utilizing the database system a record according to the stored custom object, where the metadata in the record is defined according to the custom format of the custom object; and
    defining at least one aspect of an application utilizing the database system, using the metadata of the record;
    wherein the custom object has a one-to-many relationship with a field object representing a format for a field, the one-to-many relationship defined by one of:
    storing a foreign key to the field object in the custom object, and
    creating a junction object having a reference to both the custom object and the field object.

17. An apparatus, comprising:
    a processor for:
    receiving from a first party at a database system a definition of a custom object specifying a custom format for metadata, wherein a creation of the metadata is required to comply with the custom format specified within the custom object when the metadata is associated with the custom object;
    storing the custom object having the definition, utilizing the database system;
    creating by the first party or a second party utilizing the database system a record according to the stored custom object, where the metadata in the first record is defined according to the custom format of the custom object; and
    defining at least one aspect of an application utilizing the database system, using the metadata of the record;
    wherein the custom object has a one-to-many relationship with a field object representing a format for a field, the one-to-many relationship defined by one of:
    storing a foreign key to the field object in the custom object, and
    creating a junction object having a reference to both the custom object and the field object.

18. A method for transmitting code, comprising:
    transmitting code for:
    receiving from a first party at a database system a definition of a custom object specifying a custom format for metadata, wherein a creation of the metadata is required to comply with the custom format specified within the custom object when the metadata is associated with the custom object;
    storing the custom object having the definition, utilizing the database system;
    creating by the first party or a second party utilizing the database system a record according to the stored custom object, where the metadata in the record is defined according to the custom format of the custom object; and
    defining at least one aspect of an application utilizing the database system, using the metadata of the record;
    wherein the custom object has a one-to-many relationship with a field object representing a format for a field, the one-to-many relationship defined by one of:
    storing a foreign key to the field object in the custom object, and
    creating a junction object having a reference to both the custom object and the field object.

* * * * *

UNITED STATES PATENT AND TRADEMARK OFFICE
CERTIFICATE OF CORRECTION

PATENT NO. : 9,047,070 B2
APPLICATION NO. : 13/569113
DATED : June 2, 2015
INVENTOR(S) : Avrom Roy-Faderman Page 1 of 1

It is certified that error appears in the above-identified patent and that said Letters Patent is hereby corrected as shown below:

In the Claims:

At column 21, claim number 14, line number 12, please delete "first";
At column 22, claim number 17, line number 9, please delete "first".

Signed and Sealed this
Twenty-second Day of December, 2015

Michelle K. Lee
*Director of the United States Patent and Trademark Office*